United States Patent [19]

Hirata et al.

[11] 4,326,790

[45] Apr. 27, 1982

[54] PHOTOGRAPHIC CAMERA

[75] Inventors: Noritsugu Hirata, Yokohama; Masamichi Toyama, Machida; Hidekazu Okajima, Naka; Akimasa Nishimura, Kawasaki, all of Japan

[73] Assignee: Canon Kabushiki Kaisha, Tokyo, Japan

[21] Appl. No.: 152,543

[22] Filed: May 23, 1980

[30] Foreign Application Priority Data

May 29, 1979 [JP] Japan .................................. 54-67160

[51] Int. Cl.³ ............................................ G03B 17/02
[52] U.S. Cl. ..................................... 354/288; 354/195
[58] Field of Search ................. 354/25, 288, 163, 195

[56] References Cited

U.S. PATENT DOCUMENTS

| | | | |
|---|---|---|---|
| 4,020,496 | 4/1977 | Peterson et al. | 354/25 |
| 4,067,032 | 1/1978 | Yoshikawa et al. | 354/288 |
| 4,083,060 | 4/1978 | Lange | 354/288 |
| 4,093,365 | 6/1978 | Isono | 354/25 |
| 4,123,765 | 10/1978 | Isono | 354/25 |
| 4,152,062 | 5/1979 | Kobori | 354/288 |
| 4,152,065 | 5/1979 | Kobori | 354/288 |

Primary Examiner—Russell E. Adams
Attorney, Agent, or Firm—Toren, McGeady & Stanger

[57] ABSTRACT

A camera having a distance measuring optical system and a photograph taking optical system is provided with an optical member carrying body formed by unifying a carrying member carrying at least a part of the photograph taking optical system and a carrying member carrying the distance measuring optical system. The optical member carrying body is molded with a synthetic resin and an internal reinforcement member such as a metal plate.

4 Claims, 2 Drawing Figures

PHOTOGRAPHIC CAMERA

BACKGROUND OF THE INVENTION

1. Field of the Invention

This invention generally relates to a photographic camera equipped with a distance measuring optical system and a photograph taking optical system and more particularly to an optical member carrying body disposed in the camera in which the distance measuring optical system is arranged separately from the photograph taking optical system.

2. Description of the Prior Art

In an optical apparatus of the type having a distance measuring optical system separately arranged from a photograph taking optical system, distance measurement is generally based on the principle of a base line range finder.

In this instance, not only it is important that the distance measuring optical system have a sufficient degree of precision relative to the base length thereof but, in order to precisely perform automatic focusing by displacing an optical member within a photograph taking optical system, it is also important to maintain a highly precise positional relation between the photograph taking optical system and a distance measuring optical system. This is particularly so where the camera is provided with an automatic focusing mechanism.

However, in accordance with the conventionally known art, a photograph taking optical system and a distance measuring optical system are provided with separate carrying parts for carrying them. Besides, each of these carrying parts is individually shaped by metal die casting such as aluminum die casting or zinc die casting. They are coupled with each other after a secondary machining process. Then, a photograph taking optical path and a distance measuring optical path are aligned with each other. With a photograph taking optical system and a distance measuring optical system separately shaped from each other in this manner, it has often been hardly possible to obtain a sufficient degree of overall precision. Besides, it has been extremely difficult to maintain the interconnection of the photograph taking optical system and the distance measuring optical system with each other in an adequate degree of precision against ageing changes and environmental changes such as changes in temperature and humidity. Thus, it has been virtually impossible to make highly precise alignment of these optical paths. Furthermore, with these carrying parts coupled with each other after the metal die casting process and the secondary machining process, large expenditures have been necessary for machining and assembling and thus there has been a problem also in terms of economy.

SUMMARY OF THE INVENTION

It is an object of the invention to provide an optical member carrying body which is capable of eliminating the above stated shortcomings of the conventional arrangement.

It is another object of the invention to provide a photographic camera which is capable of keeping the positional interrelation of a distance measuring optical system and a photograph taking optical system in a high degree of precision.

It is a further object of the invention to provide a photographic camera which can be manufactured through a simplified machining and assembling processes to lower the manufacturing cost thereof.

In an embodiment of the invention, a single piece of optical member carrying body is arranged to carry a distance measuring optical system and at least a part of a photograph taking optical system to ensure that the positional interrelation between the two optical systems is kept in a high degree of precision. The optical member carrying body is moulded into a single body with a synthetic resin with a reinforcement metal plate buried therein to impart sufficient rigidity and strength to the optical member carrying body.

These objects, features and advantages of the invention will become apparent from the following detailed description of an embodiment thereof taken in connection with the accompanying drawings.

DETAILED DESCRIPTION OF PREFERRED EMBODIMENT

Figure 1:
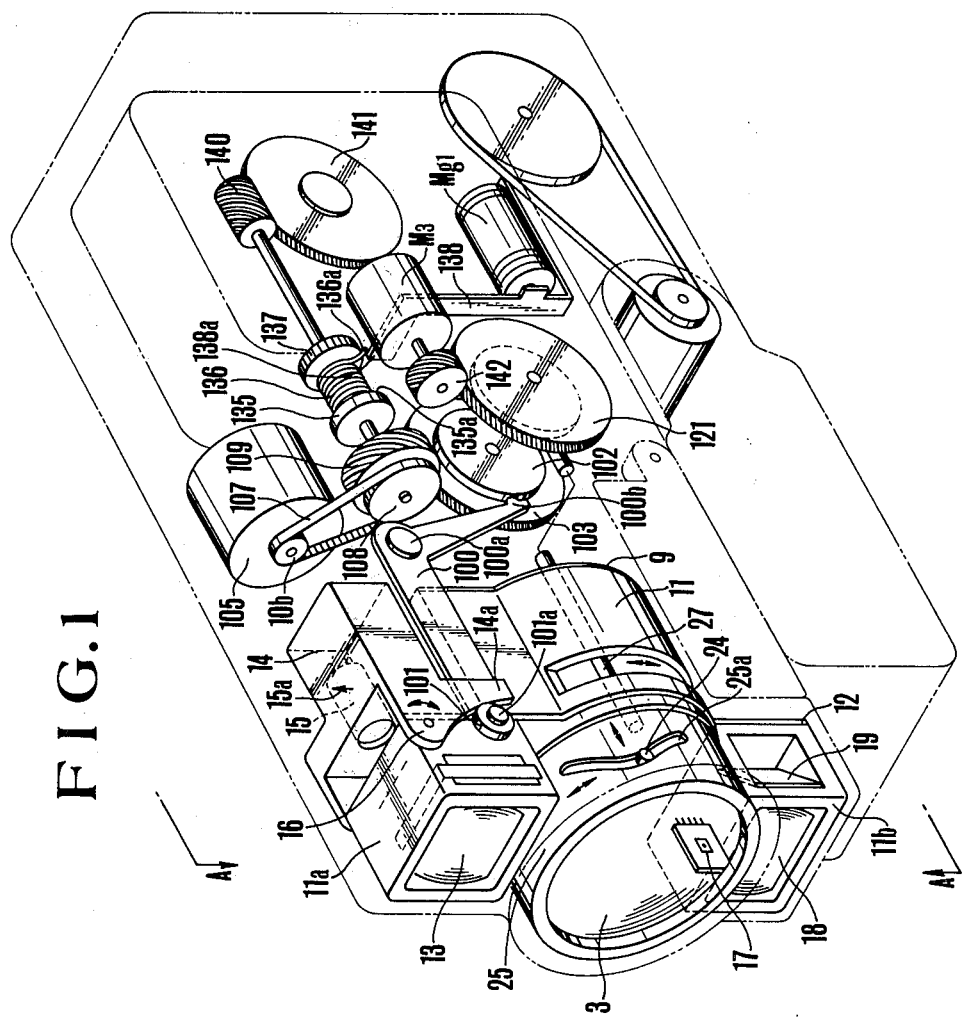
FIG. 1 is an oblique view showing the essential parts of a camera in which there is provided an optical member carrying body as embodiment of the present invention.
Figure 2:
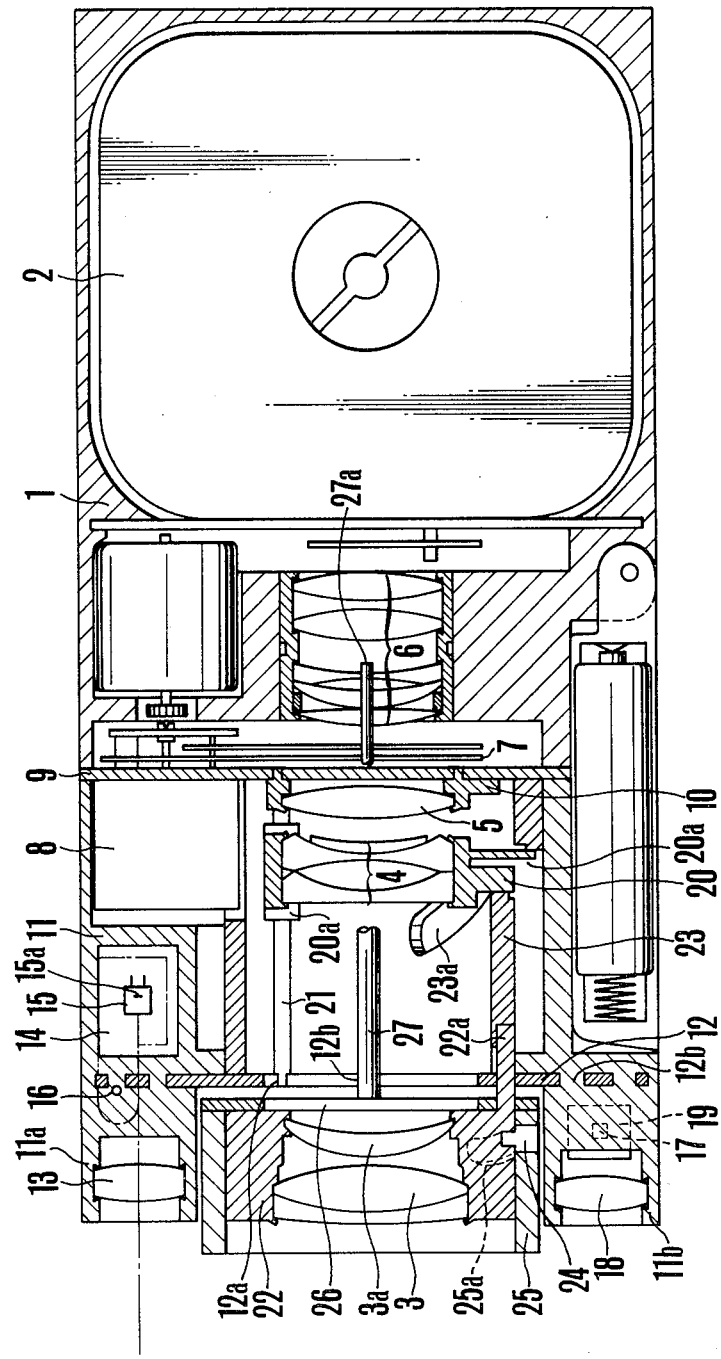
FIG. 2 is a sectional view taken on line A—A shown in FIG. 1.

FIGS. 1 and 2 show an automatic focusing camera having an optical member carrying body embodying the present invention, and includes: A rear camera body 1 which is arranged to house a film magazine; a focusing lens 3; and a lens base plate 9 which is secured to the camera body 1 in a predetermined position thereon; a fixed lens barrel block 11 which is the optical member carrying body of the present invention. The block 11 includes an upper protrusion 11a which is provided with a light projecting lens 13 and a window; a light receiving lens 18; and a lower protrusion 11b provided with a reflection mirror 19 which is arranged to guide light coming from an object to be photographed through the lens 18 to a light sensitive element 17. Also provided is a zoom mask plate 12 which is molded by insertion molding together with the above stated fixed lens barrel block 11. The zoom mask plate 12 is arranged to reinforce the fixed lens barrel block 11 while it serves to determine the positions of various optical members to fix them in their positions.

An infrared light emitting diode 15 is held by a holder 14 which is pivotally carried by a shaft 16. The holder 14 is arranged to be caused to rotate on a shaft 16 by a motor to have an image which is analogous to the shape of the electrode of the light emitting part 15a of the light emitting diode 15 projected on an object to be photographed through the light projecting lens 13. A pin 24 is arranged to engage the cam slot 25a which is provided in the cam ring 25 of the focusing lens 3. There is provided a guide shaft 27 for guiding the movement of the focusing lens during a focusing operation performed by moving the focusing lens back and forth along an optical axis. A scanning lever 100 is pivotally carried by a shaft 100a for swaying on the shaft 100a. One end of the scanning lever 100 has a roller 101 attached thereto and is disposed on a shaft 101a. The roller 101 is arranged to be in contact with a cam face formed at one end 14a of the above stated holder 14. The other end 100b of the scanning lever 100 is arranged to be constantly in contact with the cam face of a scanning cam 102. The scanning cam 102 is fixedly attached to the scanning gear 103 to have its cam lift vary according as the gear 103 rotates.

A film motor 105 has a pinion 106 disposed at the output thereof. The pinion is arranged to rotate a follower gear 108 through a timing belt 107. A worm gear 109 which is unified with the follower gear 108 into one body engages the toothed part of the scanning gear 103. When the motor 105 rotates, the cam 102 also rotates to cause the above stated light emitting diode holder 14 to sway. A focusing motor M3 is provided with a worm gear 142 to rotate a focusing gear 121 through the worm gear 142 which is connected to the output end of the motor M3. A driving force transmitting gear 137 is coaxially rotatable with the worm gear 109 to drive a shutter and a film feeding claw arrangement or the like which are not shown. Between one end face 135a of a flange 137 which is rotatable with the worm gear 109 and the driving force transmitting gear 137, there is inserted a coiled spring 136. One end of the spring 136 is fixedly attached to the flange 135 while the other end of the spring is arranged to abut the end face of the above stated gear 137. The coiled spring 136 is provided with an extension 136a which extends in the radial direction of the spring. A shaft which is fixedly connected to the gear 137 is inserted into the spring 136. However, the shaft is not connected to the flange 135. Accordingly, when rotation takes place in the direction of an arrow mark shown in the drawing, a winding tightening torque develops at the spring 136 between the flange 135 and the gear 137 to transmit a rotating force to the gear 137.

A stopper 138 protrudes within the rotating region of the extension 136a of the spring 136. When the end 138a comes to protrude there, the rotating force is no longer transmitted to the gear 137 because the winding tightening torque is removed thereby.

The stopper 138 is the armature of an electromagnet Mgl and is arranged to have its one end 138a thrust forth into the rotation locus of the extension 136a of the above stated spring 136 by a spring which is not shown. Meanwhile, part of the stopper 138 or the armature is pivotally supported by the camera body and is thus arranged to have its end part 138a come out of the rotation locus of the extension 136a when the electromagnet Mgl is excited. Therefore, when the electromagnet Mgl is in an unexcited state, the driving force of the motor 105 is transmitted to the distance measuring cam 102 only while the shutter and the film feeding mechanism are not actuated by the rotation of the motor 105.

When the electromagnet Mgl is excited, the end part of the stopper 138 is withdrawn from the rotation locus of the extension 136a of the spring 136 and the driving force of the motor 105 is transmitted to the gear 137 as well as to the cam 102. Then, by a known process, the shutter and the claw are driven by this driving force and a film take up claw is driven through a worm gear 40 and a wheel 141.

Further, a focusing cam which is not shown is fixedly attached to the focusing gear. This cam is arranged to have its cam lift vary with changes in the phase of rotation of the gear 121 while one end 27a of the guide shaft 27 is arranged to constantly abut the cam face thereof. The rotating position of the above stated scanning cam and that of the focusing cam are interrelated. Therefore, the reflection light signal which is detected at the light sensitive element 17 is processed at a distance measuring circuit which is not shown. Meanwhile, since the degree of lift of the focusing cam is interrelated to that of the scanning cam 102, the gear 121 is rotated until the rotating position of the focusing cam comes to correspond to the rotating position of the scanning cam 102 when a peak or the like is detected at the above stated distance measuring circuit. The guide shaft 27 is moved back and forth in accordance with this to carry out a focusing operation.

This invention is not limited to the above stated focusing method but is also applicable to any of other focusing methods.

In FIG. 2 which is a sectional view taken on line A—A of the illustration of the motion picture camera of FIG. 1, there are shown compensators 3 and 3a; a variable power lens 4; an afocal lens 5; a relay lens 6; a known diaphragm mechanism 7 which is arranged to be driven by a meter 8; and a lens base plate 9 which is secured to the camera body 1 as mentioned in the foregoing. A lens barrel 10 which is arranged to carry the afocal lens 5 is fixed and disposed in the direction of the optical axis and a fixed lens barrel block 11 which is employed as the above stated optical member carrying body are aligned, positioned and fixed to the lens base plate 9. The above stated light emitting diode 15 is provided with the light emitting part 15a. Further, the above stated metal plate 12 is provided with a positioning hole 12a for determining the position of a guide member 21, which is of a known type and is arranged to guide in the axial direction, a guide end part 20a of a carrying frame 20 which carries the variable power lens 4. The position of one end of this guide member 21 is determined by the above stated lens base plate. The variable power lens is thus arranged to be moved along the optical axis with this guide member serving to guide the movement of the variable power lens 4.

The focusing lens 3 has a carrying frame 22 arranged therefor. The focusing lens carrying frame 22 is provided with a key part 22a which engages with a key way provided in a cam ring 23 provided for driving the variable power lens 4. In addition to that, the focusing lens carrying frame 22 is provided also with a pin 24 which is buried therein and is arranged to engage with a groove which is provided in a focusing lens cam ring 25. The focusing lens cam ring 25 is secured to a focusing lens mask 26. Along the optical axis, there is provided a focusing lens driving guide shaft 27. The focusing operation of the focusing lens is performed by moving the focusing lens driving guide shaft 27 in the direction of the optical axis.

The rear end part 27a of the focusing lens driving guide shaft 27 is guided by a positioning guide hole (which is not shown) of the lens base plate 9 and the fore end part thereof is guided by a positioning guide hole 12b of the zoom mask plate 12 to ensure that the guide shaft is in parallel with the optical axis. The cam ring 23 of the variable power lens is provided with a cam groove 23a. A protrudent part 20a of the variable power lens frame 20 is inserted in the cam groove 23a and the power varying operation of the variable power lens 3 is performed by rotating it in the direction of the optical axis. In this instance, since the key way of the cam ring is arranged to rotate also, the focusing lens carrying frame 22 rotates together with the cam ring 23. Meanwhile, the cam ring 25 of the focusing lens then does not rotate because it is restrained from rotating by the above stated guide shaft 27. Therefore, the focusing lens carrying frame 22 is displaced along the cam groove 25a in the axial direction. However, this displacement is preset to take place in such a way as to compensate for the change of a focus position that results from the above stated power varying adjustment.

On the other hand, as mentioned in the foregoing, the focusing lens 3 is arranged to perform a focusing operation by the axial displacement of the guide shaft 27 during automatic focusing. Automatic focusing, in this instance, is performed independently of focal point adjustment resulting from the above stated power varying adjustment.

As described in detail in the foregoing, the optical axes of the movable focusing lens and the variable power lens are set in reference to the fixing lens barrel block 11 which is employed as the optical member carrying body and are securely positioned jointly by the zoom mask plate 12 and the lens base plate 9.

Further, the optical axes of the light projecting optical system and light receiving optical system which are provided for the purpose of distance measurement are respectively determined by the protrudent end parts 11a and 11b of the above stated fixing lens barrel block 11.

In this embodiment, a distance measuring optical system of a so-called active type is employed. However, it goes without saying that it may be replaced with a distance measuring optical system of a so-called passive type. The present invention is thus applicable to all of optical apparatuses of the type having a distance measuring optical system arranged separately from a photograph taking optical system.

The advantages of the fixed lens barrel block employed as the carrying body of the present invention include:

(1) In an optical apparatus having a photograph taking optical system arranged separately from a distance measuring optical system, the arrangement to have the carrying members for the above stated two optical systems molded into one unified body permits precise establishment of the relative positions of the light projecting and light receiving optical systems. Besides, the parallax precision of the photograph taking optical system relative to the distance measuring optical system can be ensured without difficulty.

(2) The zoom mask plate which is disposed within of the above stated carrying body and molded into one unified body with the latter by an insertion molding process is made from a highly rigid material such as a metal material to enhance the strength of the carrying body of the invention.

(3) Unlike the conventional carrying member used for a distance measuring optical system, the carrying member of the invention dispenses with a secondary machining process. This not only permits reduction in cost to a great extent but also permits maintenance of the machining precision without difficulty.

These are great advantages of the invention for industrial applications.

What is claimed is:
1. A camera comprising:
    (a) a photograph taking optical system for guiding light coming from an object to be photographed to a predetermined focal plane;
    (b) a distance measuring optical system for optically measuring a distance to the object, said distance measuring system being arranged to perform measurements using an optical path which differs from that of said photograph taking optical system, said two optical systems being in a predetermined positional relation to each other;
    (c) an optical member carrying body molded into a unitary structure for carrying said distance measuring optical system, and
    (d) a plate-shaped rigid construction molded inside of said optical member carrying body for guiding at least a part of said photograph taking optical system to keep said optical system in said predetermined positional relation to each other.

2. A camera according to claim 1, wherein said plate shaped construction is made of a metal material.

3. A camera according to claim 1, wherein the part of the photographic optical system which is guided by the plate is an optical system for adjusting the focal distance.

4. A camera according to claim 1, wherein the phototaking optical system includes a zoom arrangement.

* * * * *